United States Patent
Heinle et al.

(10) Patent No.: US 10,063,346 B2
(45) Date of Patent: Aug. 28, 2018

(54) METHOD AND DEVICE FOR PROTECTING A DATA TRANSPORT BLOCK AGAINST MEMORY ERRORS AND TRANSMISSION ERRORS

(71) Applicant: Intel IP Corporation, Santa Clara, CA (US)

(72) Inventors: Frank Heinle, Nuremberg (DE); Christian Ewert, Muelheim (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/993,311

(22) Filed: Jan. 12, 2016

(65) Prior Publication Data
US 2016/0277148 A1 Sep. 22, 2016

(30) Foreign Application Priority Data
Mar. 16, 2015 (DE) .................... 10 2015 103 809

(51) Int. Cl.
*H04L 1/00* (2006.01)
*H04L 1/18* (2006.01)
(52) U.S. Cl.
CPC .......... *H04L 1/0061* (2013.01); *H04L 1/0041* (2013.01); *H04L 1/1874* (2013.01); *H04L 1/1816* (2013.01)
(58) Field of Classification Search
CPC ... H04L 1/0061; H04L 1/0041; H04L 1/1874; H04L 1/1816
See application file for complete search history.

(56) References Cited

U.S. PATENT DOCUMENTS

| | | | |
|---|---|---|---|
| 2002/0083392 A1 | 6/2002 | Kim et al. | |
| 2004/0153952 A1 | 8/2004 | Sharma et al. | |
| 2005/0094615 A1* | 5/2005 | Kim | H04L 1/0003 370/349 |
| 2008/0205568 A1* | 8/2008 | Oyama | H04B 7/2643 375/365 |
| 2008/0225965 A1* | 9/2008 | Pi | H04L 1/0003 375/260 |
| 2009/0245421 A1 | 10/2009 | Montojo et al. | |

(Continued)

OTHER PUBLICATIONS

Office Action dated Jan. 20, 2016 for German Patent Application No. 102015103809.9.
(Continued)

*Primary Examiner* — Kyle Vallecillo
(74) *Attorney, Agent, or Firm* — Schiff Hardin LLP

(57) ABSTRACT

A method (600) for protecting a data transport block against memory errors and transmission errors includes: attaching (601) a first redundancy section to the data transport block for protecting the data transport block against memory errors and providing the data transport block in a memory buffer; attaching (602) a second redundancy section to the data transport block read from the memory buffer for protecting the data transport block against transmission errors and providing the data transport block for transmission; and invalidating (603) the second redundancy section if an evaluation of the first redundancy section of the data transport block read from the memory buffer indicates a memory error.

20 Claims, 9 Drawing Sheets

(56) References Cited

U.S. PATENT DOCUMENTS

| | | | |
|---|---|---|---|
| 2010/0107008 A1* | 4/2010 | Radulescu | H04L 1/1635 714/18 |
| 2012/0059958 A1* | 3/2012 | Hnatko | G06F 13/1673 710/53 |
| 2012/0079359 A1* | 3/2012 | Buckley | H03M 13/09 714/807 |
| 2012/0124251 A1* | 5/2012 | Hnatko | G06F 13/28 710/29 |
| 2012/0260137 A1* | 10/2012 | Berke | G06F 13/1673 714/721 |
| 2012/0327761 A1 | 12/2012 | Obuchi et al. | |
| 2013/0304967 A1 | 11/2013 | Hanafusa | |
| 2015/0278008 A1* | 10/2015 | Ren | H04L 1/0041 714/776 |

OTHER PUBLICATIONS

Office Action dated Jun. 30, 2016 for European Patent Application No. 16153642.0.

Office Action dated Apr. 24, 2017 with Extended Search Report for Taiwan Patent Application No. 105103608.

* cited by examiner

METHOD AND DEVICE FOR PROTECTING A DATA TRANSPORT BLOCK AGAINST MEMORY ERRORS AND TRANSMISSION ERRORS

FIELD

The disclosure relates to methods and devices for protecting a data transport block against memory errors and transmission errors, in particular by utilizing HARQ mechanism for correction of intermittent failures in on-chip memory.

BACKGROUND

Modem chips for modern communication standards, for example mobile communication standards such as LTE (Long Term Evolution) become increasingly complex. In particular the on-chip memory size increases with the peak data rates provided by the respective standard (e.g. up to 600 Mbps for the latest releases of LTE). On the other hand the progress of silicon process technology continuously increases the on-chip memory density. Therefore, chips become more and more susceptible to intermittent or persistent memory failures occurring during their life time. Depending on the criticality of memory errors more or less complex countermeasures can be taken, ranging from no protection at all or repair of non-functional memory instances during factory test to full-blown real-time error correction coding (ECC) for each memory cell.

Methods and devices employed in data communication networks constantly have to be improved. In particular, it may be desirable to improve the error protection of the modem, in particular the modem of the mobile device in situations as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
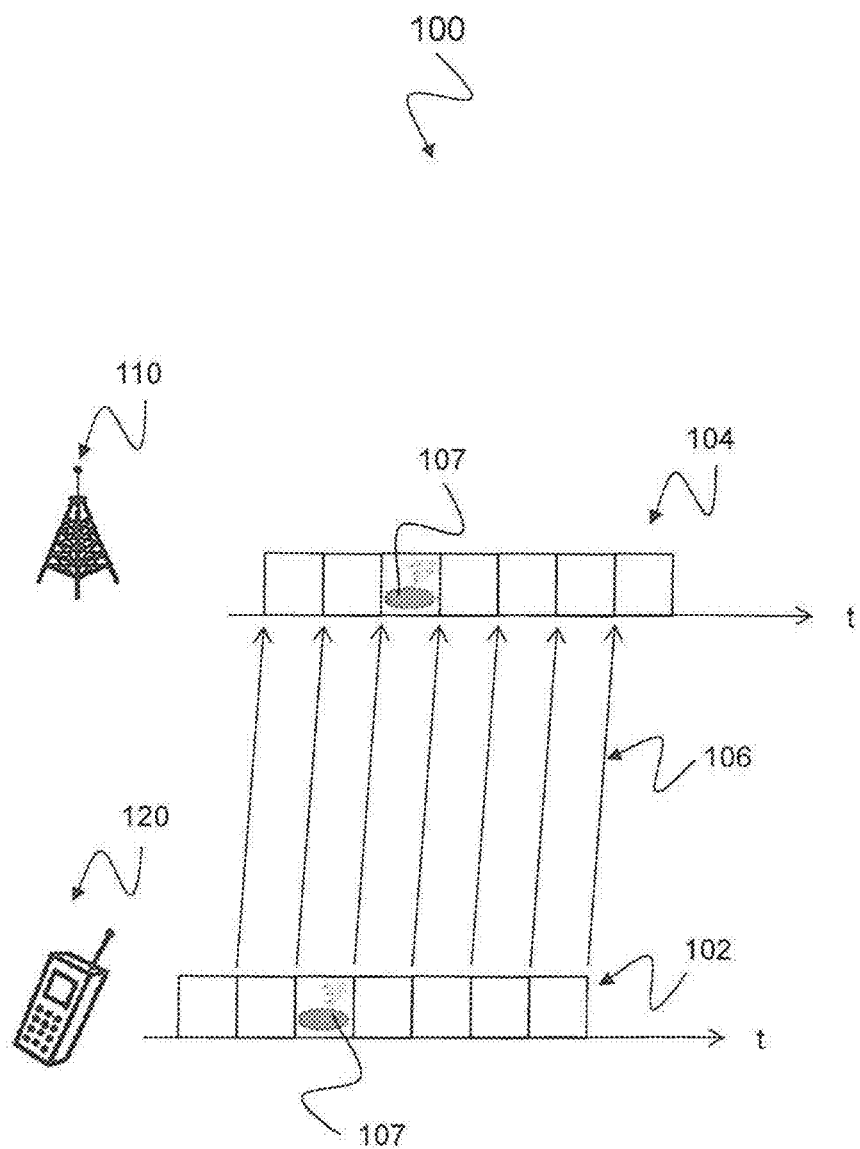
FIG. 1 is a schematic diagram of a radio communication network 100 including a base station 110 and a mobile terminal 120.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The methods and devices described herein may be based on error correction coding and redundancy mechanisms such as cyclic redundancy check (CRC) and parity check. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods, devices and systems described herein may be configured to process data transport blocks. A data transport block is a block of data configured for transportation between different data entities such as protocol layers or physical units. In an LTE system, for example, data from the upper layer (or MAC) given to the physical layer is basically referred to as transport block or data transport block. For each Transmission Time Interval (TTI) one or more transport blocks may be generated. The transport block size may be decided by the number of Physical Resource Blocks and the Modulation and Coding Scheme (MCS). CRC (cyclic redundancy check) may be appended to each transport block which provides error detection. The transport block may be segmented into code blocks before being passed to the channel coding and rate matching modules.

The methods, devices and systems described herein may be configured to provide data redundancy, in particular by attaching redundancy sections to a data transport block. Data redundancy is the existence of data that is additional to the actual data and permits correction of errors in stored or transmitted data. The additional data can be simply a complete copy of the actual data, or only selected pieces of data that allow detection of errors and reconstruction of lost or damaged data up to a certain level. For example, by including additional data checksums, ECC memory is capable of detecting and correcting single-bit errors within each memory word. Error correction coding bits are used by the ECC memory without being visible to the outside. I.e., during writing to the ECC memory internal redundancy bits are generated and subsequently used for correction when reading from the ECC memory. These internal redundancy bits are not transmitted together with the transmit data.

The methods, devices and systems described herein may be configured to provide data redundancy, in particular by attaching one or more parity bits to a data transport block. A parity bit is a bit added to a string of binary code, e.g. to the end or the beginning, that indicates whether the number of bits in the string with the value one is even or odd. Parity bits are used as the simplest form of error detecting code. In the case of even parity, the number of bits whose value is 1 in a given set is counted. If their total number is odd, the parity bit value is set to 1, making the total count of 1's in the set an even number. If the count of ones is even, the parity bit's value remains 0. In the case of odd parity, the situation is reversed. Instead, if the sum of bits with a value of 1 is odd, the parity bit's value is set to zero. And if the sum of bits with a value of 1 is even, the parity bit value is set to 1, making the total count of 1's in the set an odd number.

The methods, devices and systems described herein may be configured to provide data redundancy, in particular by attaching cyclic redundancy checks. A cyclic redundancy check (CRC) is an error-detecting code commonly used in digital networks and storage devices to detect accidental changes to raw data. Blocks of data entering these systems get a short check value attached, based on the remainder of a polynomial division of their contents. On retrieval the calculation is repeated, and corrective action can be taken against presumed data corruption if the check values do not match. CRCs are so called because the check (data verification) value is a redundancy, i.e. expanding the message without adding information and the algorithm is based on cyclic codes.

The methods, devices and systems described herein may be based on Hybrid Automatic Repeat Request (HARQ) mechanism. HARQ is a combination of high-rate forward error-correcting coding and ARQ error-control. In standard ARQ, redundant bits are added to data to be transmitted using an error-detecting (ED) code such as a cyclic redundancy check (CRC). Receivers detecting a corrupted message will request a new message from the sender. In Hybrid ARQ, the original data is encoded with a forward error correction (FEC) code, and the parity bits are either immediately sent along with the message or only transmitted upon request when a receiver detects an erroneous message.

The methods and devices described herein may be implemented in wireless communication networks, in particular communication networks based on UMTS (Universal Mobile Telecommunications System) and 3GPP ($3^{rd}$ Generation Partnership Project) systems. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

FIG. 1 is a schematic diagram of a radio communication network 100 including a base station 110 and a mobile terminal 120. In radio communication between a UE (user equipment) 120 and a base station 110 a sequence of data transport blocks 102 may be transmitted in uplink direction 106 from UE 120 to base station 110. One or more data transport blocks may be corrupted by one or more memory errors 107. In FIG. 1 one memory error in the third data transport block is shown. The transmitted sequence of transport blocks 102 is received at the base station 110 as a received sequence of transport blocks 104 including the one or more memory errors 107. In this scenario, the base station 110 cannot detect the memory error 107.

Figure 2:
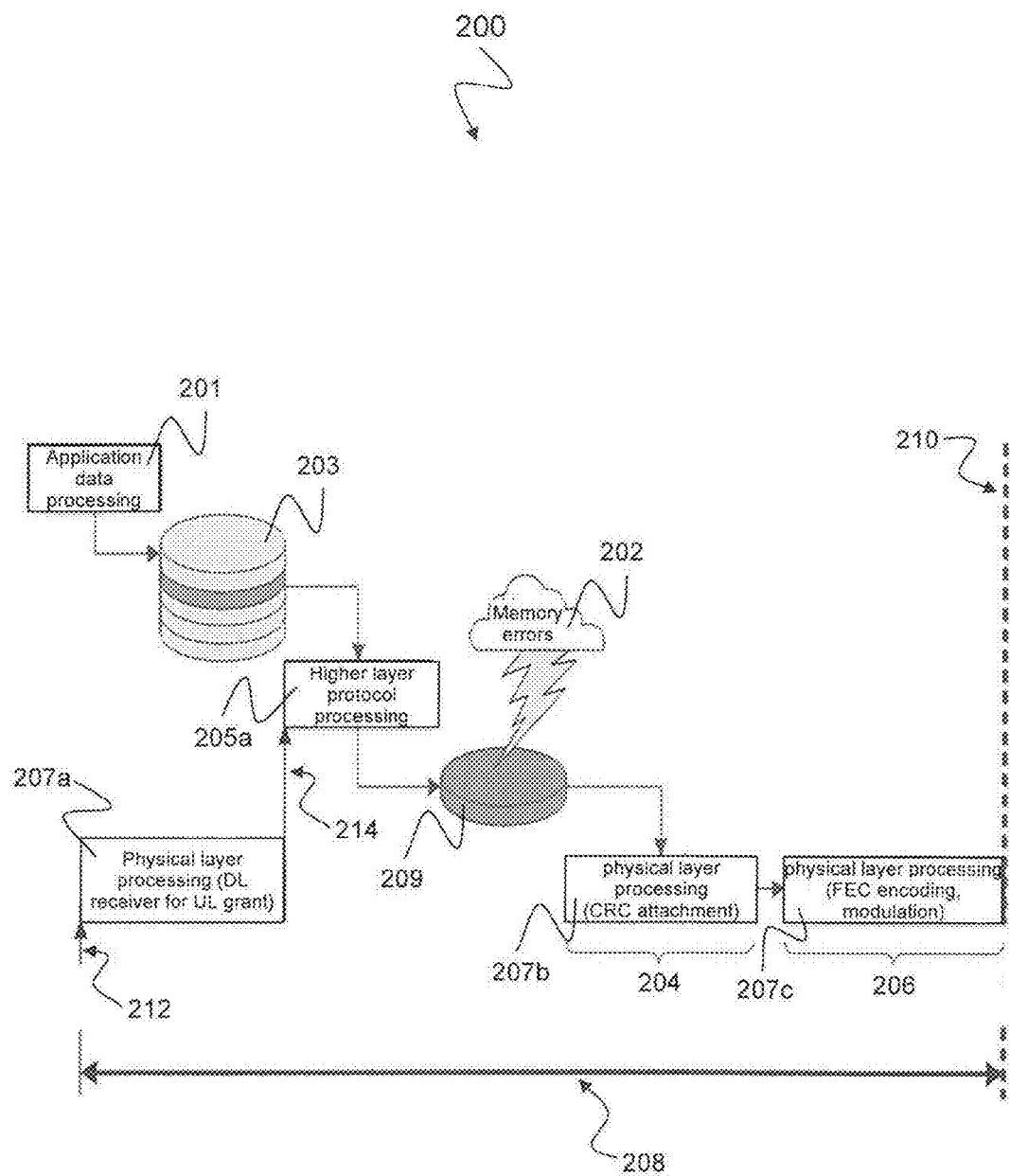
FIG. 2 is a schematic diagram of a method 200 for error protection in a mobile receiver for protection against transmission errors.

FIG. 2 is a schematic diagram of a method 200 for error protection in a mobile receiver for protection against transmission errors.

In the application data processing block 201 data may be processed. The resulting transport blocks or data transport blocks may be provided to protocol stack memory 203 for data storage. Upon uplink grant arrival over the air 212 the physical layer processing block 207a may be started, e.g. Downlink receiver for Uplink grant. Physical layer processing 207a may provide grant 214 for higher layer and may request data for transmission. When receiving that grant 214 the higher layer protocol processing block 205a may retrieve a data transport block stored in memory buffer 203 and perform protocol processing on that data transport block. The processed data transport block may be stored in a first memory buffer 209, for example one memory buffer of the protocol stack memory 203. That first memory buffer 209 may be corrupted by memory errors 202 not detectable at receiver side. The physical layer processing block 207b may retrieve the processed data transport block corrupted by memory errors from the first memory buffer 209 and may perform transmit error protection on that block, e.g. by attaching CRC, to allow detecting blocks which have been corrupted on the air and cannot be decoded any more 204. The physical layer processing block 207c may further perform FEC (forward error correction) encoding and modulation on that block to allow correcting blocks which have been corrupted on the air 206.

Usually there is a tight time constraint 208 from start of processing a data transport block triggered by uplink grant arrival over the air 212 until deadline 210 for data transmission over the air. Such a time constraint 208 may be in a range of about 4 milliseconds and smaller in an exemplary LTE transmission. Processing has to be completed within such time frame 208.

Figure 3:
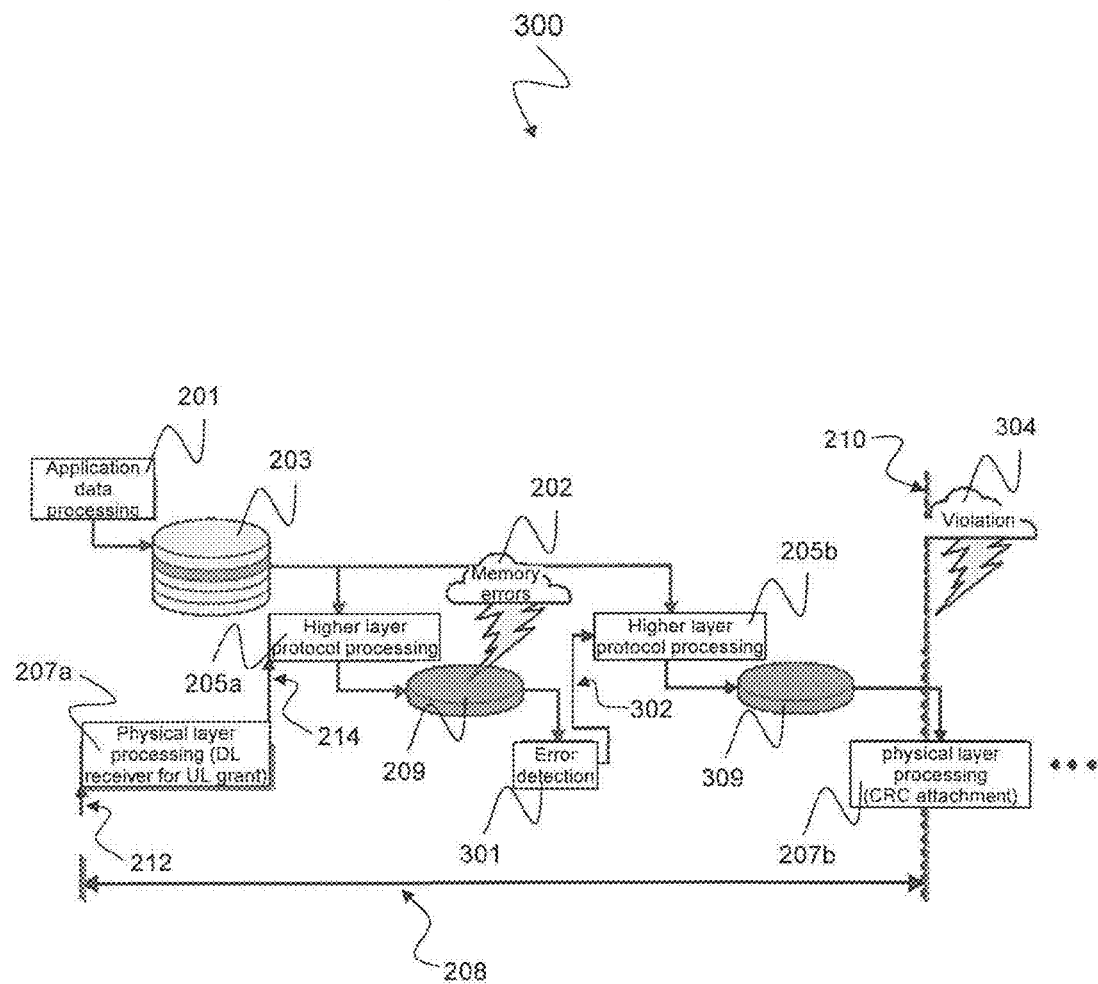
FIG. 3 is a schematic diagram of a method 300 for memory error detection in a mobile receiver using higher layer protocol processing.
Figure 4:
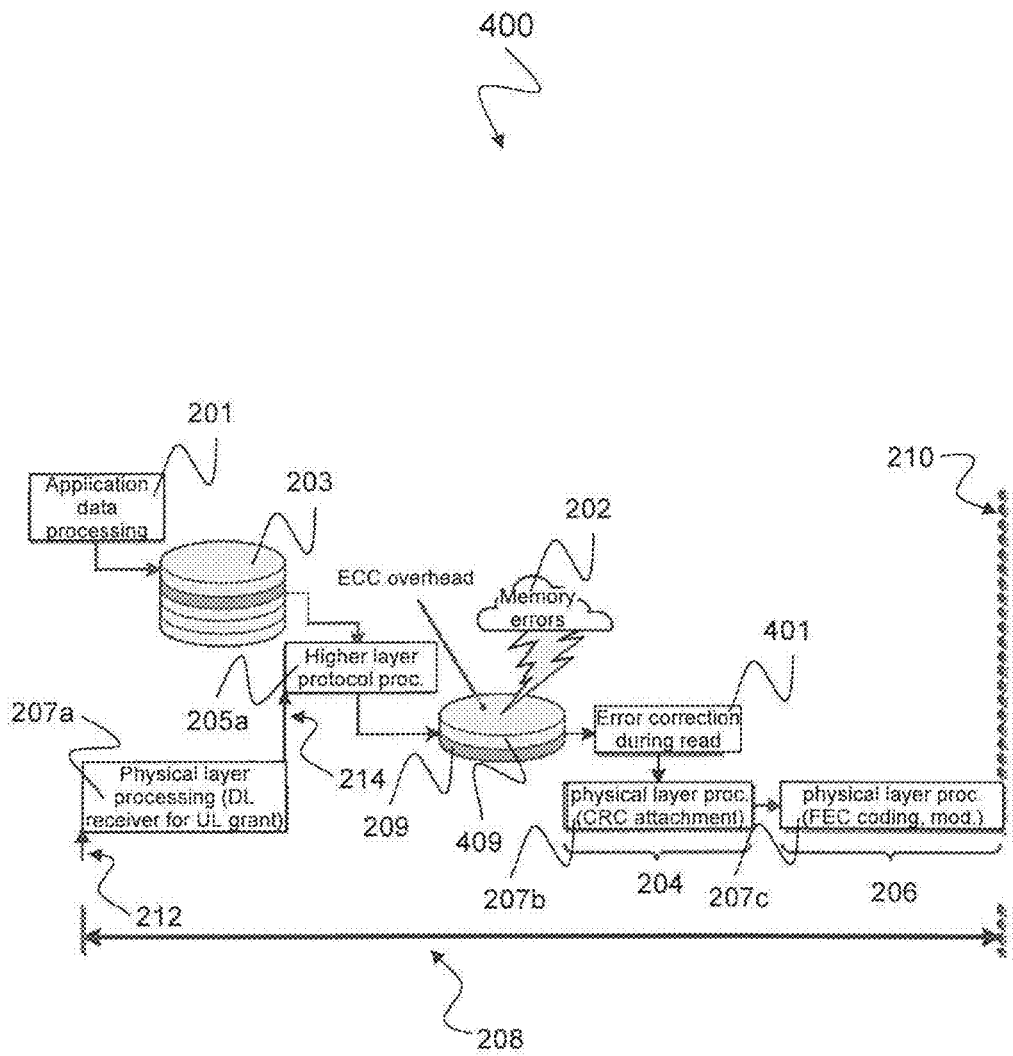
FIG. 4 is a schematic diagram of a method 400 for error protection in a mobile receiver using error correction and ECC overhead.

Some sorts of data, e.g. higher layer control or user data before doing the channel encoding for an uplink transmission are particularly sensitive as errors cannot be detected on the receiving side (e.g. an LTE base station/eNodeB). Due to the short latency requirement and fast responsiveness of e.g. LTE a simple detection and re-transmission from higher protocol layers may be not practical. Therefore, a full-blown ECC protection may be required as illustrated in FIGS. 3 and 4. These figures give an overview of the implications of memory errors in the uplink transmission chain.

FIG. 3 is a schematic diagram of a method 300 for memory error detection in a mobile receiver using higher layer protocol processing.

In the application data processing block 201 data may be processed as described above with respect to FIG. 2. The resulting transport blocks or data transport blocks may be provided to protocol stack memory 203 for data storage. Upon uplink grant arrival over the air 212 the physical layer processing block 207a may be started, e.g. Downlink receiver for Uplink grant. Physical layer processing 207a may provide grant 214 for higher layer and may request data for transmission. When receiving that grant 214 the higher layer protocol processing block 205a may retrieve a data transport block stored in memory 203 and perform protocol processing on that data transport block. The processed data transport block may be stored in a first memory buffer 209 as described above with respect to FIG. 2.

That first memory buffer 209 may be corrupted by memory errors 202 not detectable at receiver side. An error detection block 301 may detect one or more errors in a data transport block retrieved from the first memory buffer 209 and may indicate a resend request 302 to the higher layer protocol processing block 205*b*. When receiving the resend request 302 the higher layer processing block 305*b* may retrieve the data transport block from the memory 203 one more time and store the retrieved data transport block in a second memory buffer 309 for further processing. The physical layer processing block 207*b* may retrieve the data transport block from the second memory buffer 309 for physical layer processing, e.g. CRC attachment etc. However due to the strict timing constraint 208 the deadline 210 for data transmission over the air may be exceeded that may result in a violation 304 of timing constraints.

FIG. 4 is a schematic diagram of a method 400 for error protection in a mobile receiver using error correction and ECC overhead.

In the application data processing block 201 data may be processed as described above with respect to FIGS. 2 and 3. The resulting transport blocks or data transport blocks may be provided to protocol stack memory 203 for data storage. Upon uplink grant arrival over the air 212 the physical layer processing block 207*a* may be started, e.g. Downlink receiver for Uplink grant. Physical layer processing 207*a* may provide grant 214 for higher layer and may request data for transmission. When receiving that grant 214 the higher layer protocol processing block 205*a* may retrieve a data transport block stored in memory 203 and perform protocol processing on that data transport block. The processed data transport block may be stored in a first memory buffer 209 as described above with respect to FIGS. 2 and 3.

Additionally, the processed data transport block may be stored in an ECC overhead or redundant buffer 409 protecting the first memory buffer 209. When reading the processed data transport block by the physical layer processing block 207*b*, error correction may be performed during reading by an error correction block 401. The error correction block 401 may detect an error in the data transport block retrieved from the first memory buffer 209 and may correct the data transport block based on information of both memory buffers, the first memory buffer 209 and the redundant memory buffer 409. In one example, the erroneous data transport block of the first memory buffer 209 is replaced by the correct data transport block of the redundant memory buffer 409. Alternatively redundancy bits stored in the redundant memory buffer 409 may be used to correct the data transport block of the first memory buffer 209.

The physical layer processing block 207*b* may receive the corrected data transport block and may perform physical layer processing, e.g. CRC attachment etc. A further physical layer processing block 207*c* may perform physical layer processing with respect to FEC encoding, modulation etc. as described above with respect to FIG. 2. Due to the redundant memory buffer 409 and error correction during read 401 the deadline 210 for data transmission over the air may be met.

Figure 5:
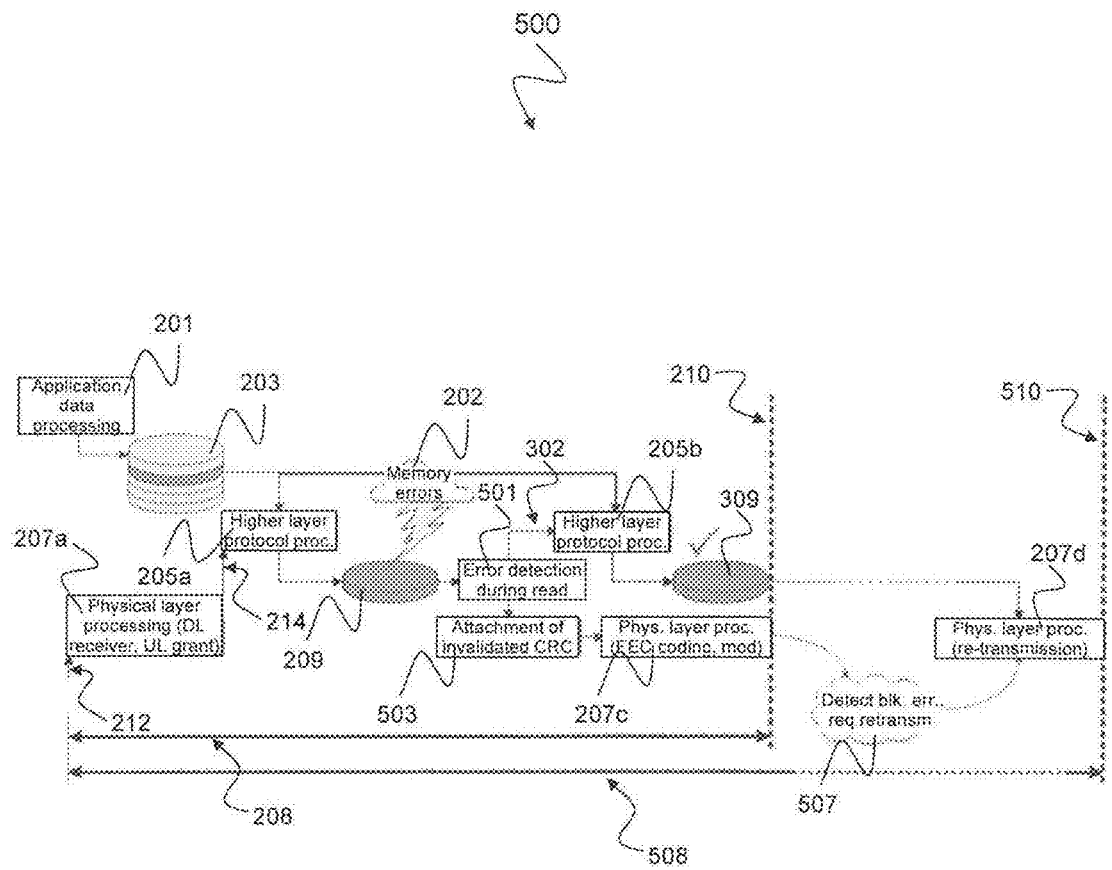
FIG. 5 is a schematic diagram of a method 500 for error protection in a mobile receiver using a processing chain in accordance with the disclosure.

FIG. 5 is a schematic diagram of a method 500 for error protection in a mobile receiver using a processing chain in accordance with the disclosure.

In the application data processing block 201 data may be processed as described above with respect to FIGS. 2 to 4. The resulting transport blocks or data transport blocks may be provided to protocol stack memory 203 for data storage. Upon uplink grant arrival over the air 212 the physical layer processing block 207*a* may be started, e.g. Downlink receiver for Uplink grant. Physical layer processing 207*a* may provide grant 214 for higher layer and may request data for transmission. When receiving that grant 214 the higher layer protocol processing block 205*a* may retrieve a data transport block stored in memory 203 and perform protocol processing on that data transport block. The processed data transport block may be stored in a first memory buffer 209 as described above with respect to FIGS. 2 to 4.

That first memory buffer 209 may be corrupted by memory errors 202 not detectable at receiver side. An error detection block 501 may detect one or more errors in a data transport block retrieved from the first memory buffer 209. In a CRC attachment block 503 an invalidated CRC may be attached to that erroneous data transport block and the erroneous data transport block with invalidated CRC may be passed to the physical layer processing block 207*b* for further processing such as FEC coding, modulation etc. When a memory error is detected by the error detection block 501 a resend request 302 may be indicated to the higher layer protocol processing block 205*b*. When receiving the resend request 302 the higher layer processing block 305*b* may retrieve the data transport block from the memory 203 one more time and store the retrieved data transport block in a second memory buffer 309 for further processing. Both tasks retrieving the data transport block once more and physical layer processing 207*b* may be finished within a processing time constraint 208.

At receiver side, for example at the base station, the erroneous data transport block may be detected 507 based on its invalidated CRC. After detecting a block error the receiver may request re-transmission, e.g. according to a HARQ mechanism, and a retransmitted data transport block may be provided by the physical layer processing block 207*b* in the next time frame, i.e. until deadline 510 for data re-transmission over the air. The re-transmission may be completed within a more relaxed processing time constraint 508 that may be, for example twice the time constraint 208 for a single re-transmission plus round-trip time. Of course, more than one re-transmission may be performed.

The method 500 may thus exploit the re-transmission capabilities as provided by the data communication standards such as HARQ combined with a low-complexity error detection to perform a real-time correction of memory errors.

In one example, when storing the processed data transport block in the first memory buffer 209, parity bits may be added to each data word written from the protocol stack 205*a*. The number of parity errors may be tracked for every data block which may be protected by appending cyclic redundancy check (CRC) bits, e.g. a code or transport block in LTE. If at least one parity error occurs in a block, the respective CRC bits may be invalidated by the block 503, e.g. preferably by flipping a single bit of the CRC bits or alternatively by flipping more than one bit of the CRC bits or by scrambling the CRC bits with a random bit sequence. Subsequently, the data block may be encoded and transmitted over the air by the block 207*b* while the error is reported back 302 to the protocol stack 205*b*. Due to the "wrong" CRC, the receiving side, e.g. an LTE base station will rate the data block as erroneous and request a re-transmission 507 from the sender. This is acceptable from a performance point of view as the memory error probability is significantly lower than the block error rate on the air. Typically, networks are dimensioned to work with block error rates of ~10%.

Due to the relatively high round-trip time, the protocol stack is able to identify the corrupted data block and to resend it in time to the physical layer 207*d* before the re-transmission 508 has to be done.

This solution significantly reduces the complexity of memory error correction by just adding a parity bit instead of a full-blown ECC. By invalidating the CRC 503, the method 500 prevents the receiving side from erroneously assuming the data block to be correct which would result in potentially severe user application or radio resource management errors. At the same time, by exploiting the standard re-transmission mechanisms and its round-trip delay, sufficient time for reporting and correcting the data block is obtained, i.e. no severe time constraints are created by repairing the corrupt data block. There is hardly any impact on the overall performance, as the memory error rate is typically much smaller than the normal block error rate observed on the air.

The method 500 can be used for all communication standards supporting some kind of re-transmission mechanisms, e.g. WLAN or wired standards such as DSL.

Figure 6:
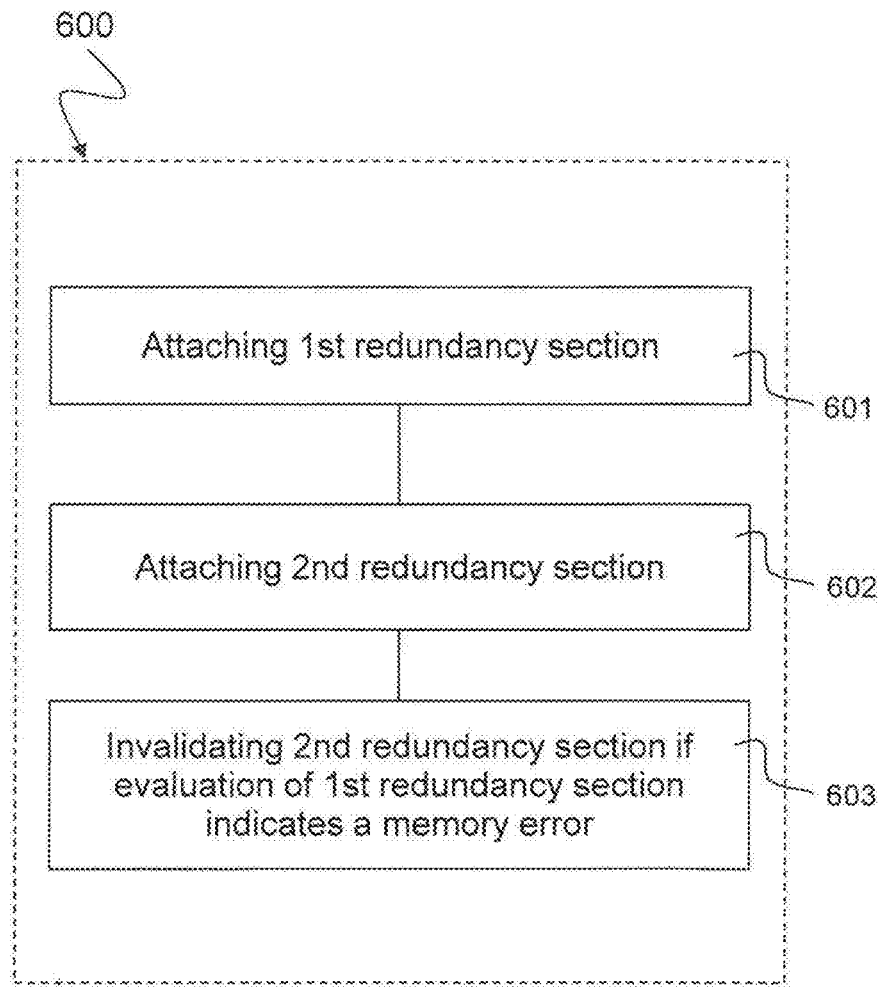
FIG. 6 is a schematic diagram of a method 600 for error protection in a receiver in accordance with the disclosure.

FIG. 6 is a schematic diagram of a method 600 for error protection in a receiver in accordance with the disclosure. The method 600 protects a data transport block against memory errors and transmission errors. The method 600 includes attaching 601 a first redundancy section to the data transport block for protecting the data transport block against memory errors and providing the data transport block in a memory buffer, e.g. the first memory buffer 209 as described above with respect to FIG. 5. The method 600 includes attaching 602 a second redundancy section to the data transport block read from the memory buffer for protecting the data transport block against transmission errors, e.g. a CRC as described above with respect to FIG. 5, and providing the data transport block for transmission. The method 600 includes invalidating 603 the second redundancy section if an evaluation of the first redundancy section of the data transport block read from the memory buffer indicates a memory error, e.g. by attaching an invalidated CRC 503 as described above with respect to FIG. 5.

The method 600 may include providing the first redundancy section based on a parity check of the data transport block. The first redundancy section may include one or more parity bits indicating a parity of at least a part of the data transport block. The method 600 may include attaching a parity bit to the data transport block for each memory cell of the memory buffer in which the data transport block is provided, e.g. to each memory cell of the first memory buffer 209 as described above with respect to FIG. 5. Such a memory cell may be a word of for example 4 bits, 8 bits, 16 bits or 32 bits. A higher word length results in a lower overhead but decreases the detectability.

The evaluation of the first redundancy section may include counting a number of parity check errors while reading the data transport block from the memory buffer. The second redundancy section may be invalidated as soon as a first parity check error is detected or only if a specific number of parity check errors are detected. The method 600 may further include transmitting the data transport block attached with the invalidated second redundancy section if a memory error is indicated. The second redundancy section may be provided based on a cyclic redundancy check of the data transport block. Invalidating the second redundancy section may include reversing at least one bit of the second redundancy section or scrambling the second redundancy section with a scrambling sequence.

The method 600 may include reporting an indicated memory error. The method 600 may include repairing the data transport block for which a memory error is reported; and providing the repaired data transport block for retransmission. The method 600 may include removing the first redundancy section from the data transport block when attaching the second redundancy section to the data transport block. The data transport block may be transmitted with CRC field, however, no parity bits as described above with respect to memory protection should be transmitted by the data transport block. The method 600 may include processing the data transport block and the attached second redundancy section for uplink transmission, e.g. by the physical layer processing block 207*b* as described above with respect to FIG. 5. The method 600 may include processing the data transport block and the attached second redundancy section according to a HARQ transmission scheme.

Figure 7:
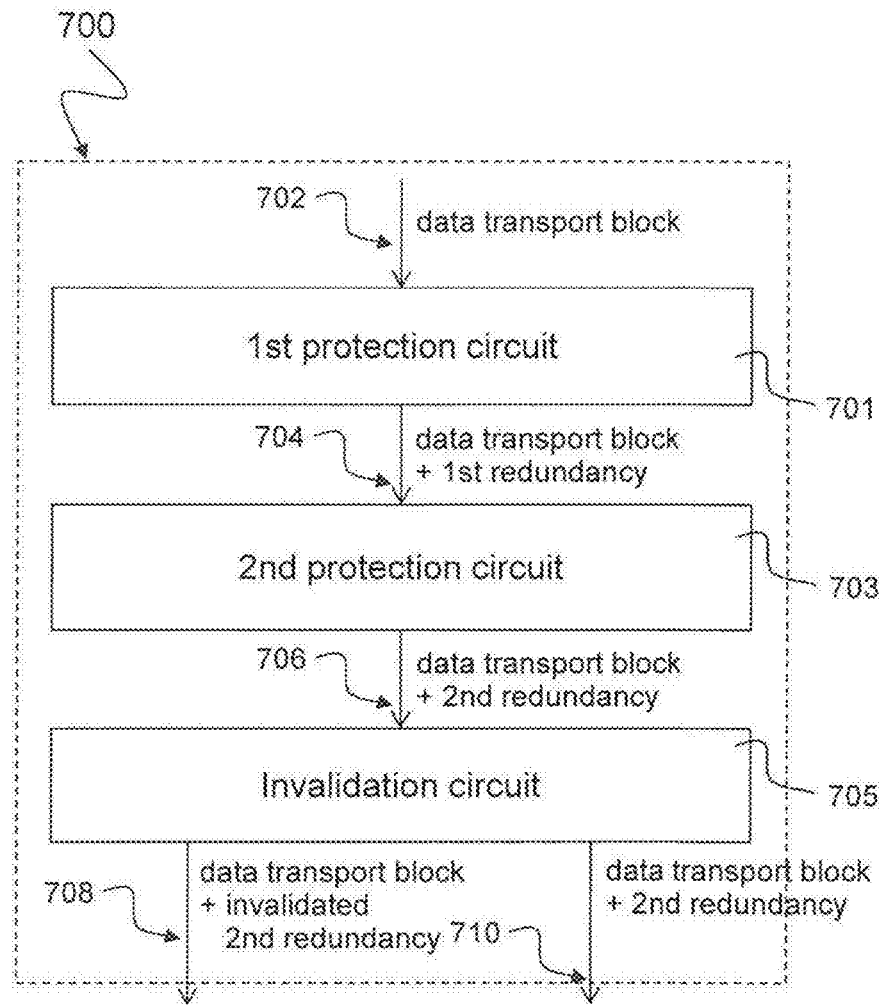
FIG. 7 is a block diagram of a device 700 for error protection in a receiver in accordance with the disclosure.

FIG. 7 is a block diagram of a device 700 for error protection against memory errors and transmission errors in a receiver in accordance with the disclosure. The device 700 includes a first protection circuit 701, a second protection circuit 703 and an invalidation circuit 705.

The first protection circuit 701 is configured to attach a first redundancy section 704, e.g. one or more parity bits, to the data transport block 702 for protecting the data transport block 702 against memory errors and configured to provide the data transport block 702 with the first redundancy section 704 in a memory buffer, e.g. a first memory buffer 209 as described above with respect to FIG. 5. The second protection circuit 703 is configured to attach a second redundancy section 706, e.g. a CRC checksum, to the data transport block 702 read from the memory buffer for protecting the data transport block 702 against transmission errors and configured to provide the data transport block 710 with the second redundancy section 706 for transmission. The invalidation circuit 705 is configured to invalidate the second redundancy section 706 if an evaluation of the first redundancy section 704 of the data transport block 702 read from the memory buffer indicates a memory error. Then the data transport block 708 with the invalidated second redundancy section 706 may be provided for transmission.

The device 700 may include a parity check circuit to check a parity of the data transport block 702. The first protection circuit 701 may be configured to provide the first redundancy section 704 based on the parity check of the data transport block 702. The device 700 may include a counter configured to count a number of parity check errors for the data transport block 702 read from the memory buffer. The device 700 may include a cyclic redundancy check processing circuit to process a cyclic redundancy check of the data transport block 702. The second protection circuit 703 may be configured to provide the second redundancy section 706 based on the cyclic redundancy check of the data transport block 702.

The invalidation circuit 705 may include a bit reversing circuit configured to reverse at least one bit of the second redundancy section 706 to invalidate the second redundancy section 706. The invalidation circuit 705 may include a scrambler configured to scramble the second redundancy section 706 with a scrambling sequence, e.g. a random sequence, to invalidate the second redundancy section 706. The device 700 may further include a reporting circuit configured to report an indicated memory error. The device 700 may further include a protocol processing circuit, configured to repair the data transport block 702 for which a memory error is reported and to provide the repaired data transport block 702 for retransmission, e.g. a protocol processing circuit 207*d* as described above with respect to FIG. 5.

The device 700 may be implemented in any receiver, for example a wired networks receiver such as a DSL receiver or a mobile receiver such as an LTE receiver or WLAN receiver.

Figure 8:
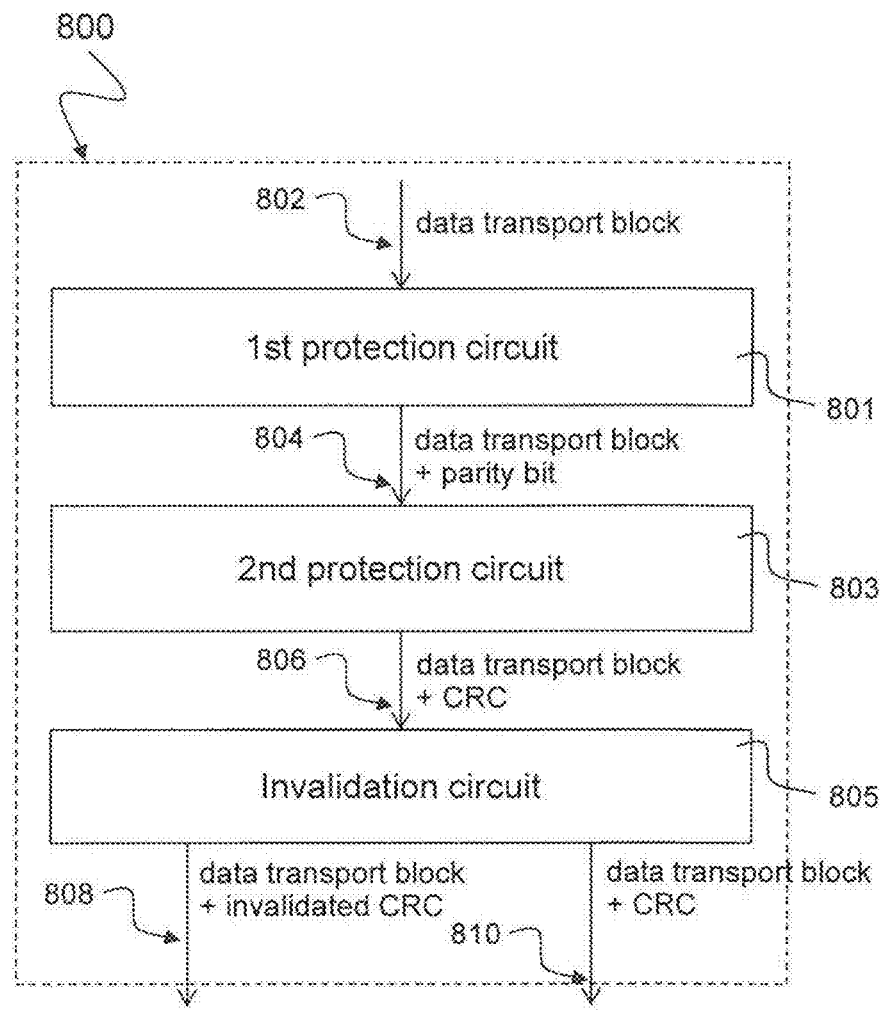
FIG. 8 is a block diagram of an on-chip system 800 for error protection in a receiver in accordance with the disclosure.

FIG. 8 is a block diagram of an on-chip system 800 for error protection in a receiver in accordance with the disclosure. The system 800 includes a first protection circuit 801, a second protection circuit 803 and an invalidation circuit 805.

The first protection circuit 801 is configured to attach at least one parity bit 804 to the data transport block 802 for protecting the data transport block 802 against memory errors. The at least one parity bit 804 may be determined over at least a part of the data transport block 802 and may be configured to provide the data transport block 802 in a memory buffer, e.g. a first memory buffer 209 as described above with respect to FIG. 5. The second protection circuit 803 is configured to attach a cyclic redundancy checksum 806 to the data transport block 802 read from the memory buffer for protecting the data transport block 802 against transmission errors and configured to provide the data transport block 802 for transmission. The invalidation circuit 805 is configured to invalidate the cyclic redundancy checksum 806 if an evaluation of the at least one parity bit 804 of the data transport block 802 read from the memory buffer indicates a parity error.

The system 800 may include a protocol processing circuit, e.g. a block 207d as described above with respect to FIG. 5, configured to repair the data transport block 802 for which a parity error is indicated and to provide the repaired data transport block for retransmission. The invalidation circuit 805 may correspond to the invalidation circuit 705 as described above with respect to FIG. 7.

The on-chip system 800 may be implemented in any receiver, for example a wired networks receiver such as a DSL receiver or a mobile receiver such as an LTE receiver or WLAN receiver.

Figure 9:
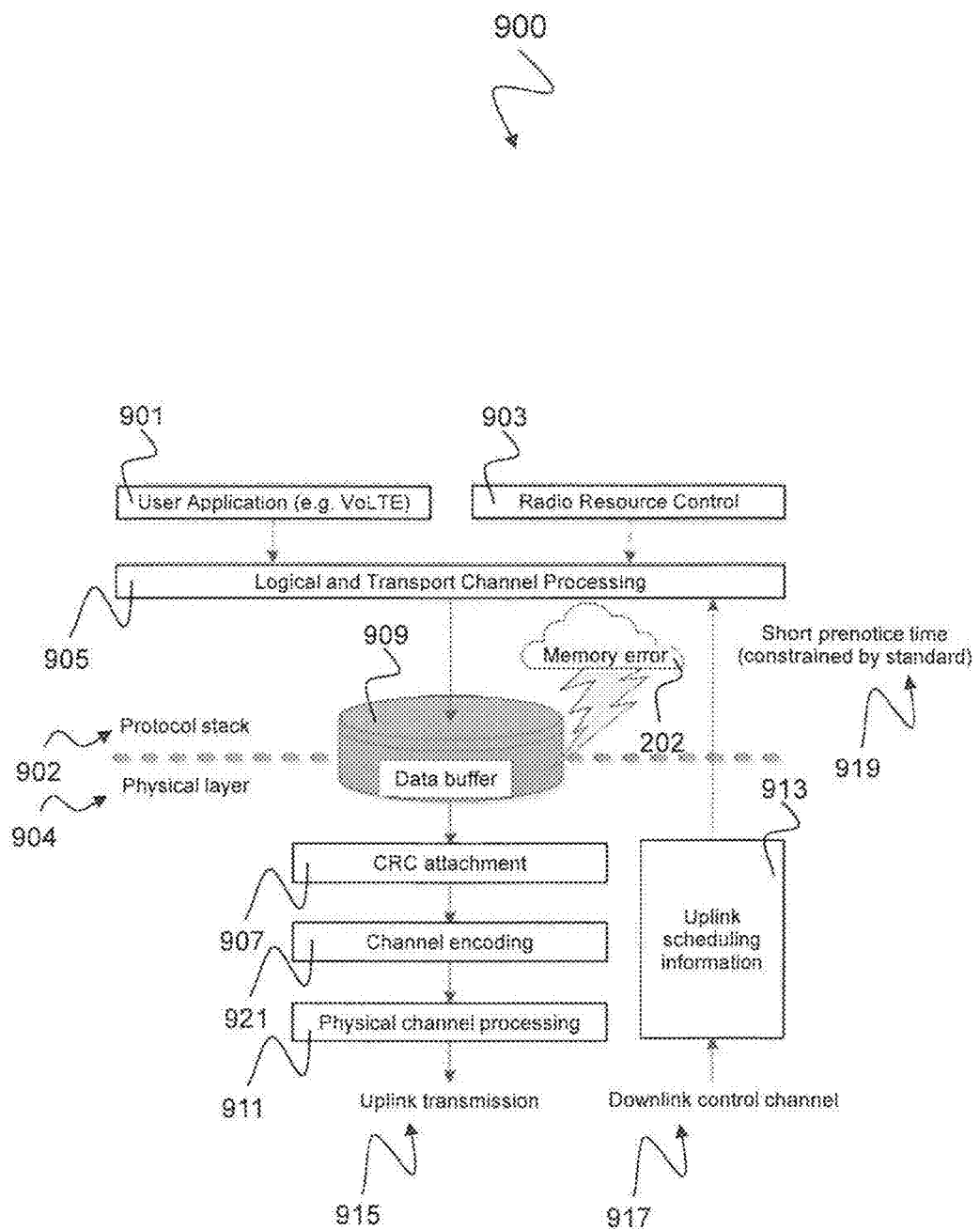
FIG. 9 is a block diagram of an on-chip system 900 for error protection in a mobile receiver in accordance with the disclosure.

FIG. 9 is a block diagram of an on-chip system 900 for error protection in a mobile receiver in accordance with the disclosure. The on-chip system 900 includes a protocol stack 902 and a physical layer 904 which are coupled by a data buffer 209, e.g. a first memory buffer 209 as described above with respect to FIG. 5.

In the protocol stack 902 a user application block, e.g. for Voice over LTE, is coupled together with a radio resource control block 903 to a logical and transport channel processing block 905 for providing a data transport block attached with one or more parity bits to the data buffer 909 in which one or more memory errors 202 may occur as described above with respect to FIGS. 5 to 8.

In the physical layer 904 a CRC attachment 907 may be implemented for attaching a CRC checksum to a data transport block retrieved from the data buffer 909. The CRC attachment block 907 may attach an invalidated CRC to the data transport block if the data transport block retrieved from the data buffer 909 is corrupted by a memory error 202 which corruption may be detected according to the mechanisms described above with respect to FIGS. 5 to 8. After CRC attachment 907 the data transport block may be passed to channel encoding 921 and physical channel processing 911 for uplink transmission 915.

From downlink control channel 917 a pre-notice time, e.g. constrained by standard, may be received within an uplink scheduling information block 913 for providing timing constraints, e.g. timing constraints 208 and/or timing constraints including round-trip delay 508 as described above with respect to FIG. 5 to the logical and transport channel processing block 905. If necessary, a re-transmission may be scheduled by the protocol stack 902.

The protocol stack 902 may implement the blocks 205a, 205b as described above with respect to FIG. 5. The physical layer 904 may implement the blocks 207a, 207b, 207c, 207d, 501, 503 as described above with respect to FIG. 5. The blocks described in FIG. 9 may have the same functionalities as corresponding blocks described above with respect to FIGS. 7 and 8.

Methods and devices according to the disclosure may be based on the assumption that higher protocol stack layers provide the data for uplink transmission (e.g. an LTE transport block) in an on-chip memory buffer to the physical layer. Usually, this buffer is preserved inside the physical layer for potential re-transmissions. As the buffer may not be duplicated somewhere else, the complete higher layer processing may be required to "repair" a corrupt data block. While writing to the buffer, the hardware may add a parity bit per data word. As the bit error rate is considered to be low (or example in the range of $10^{-6}$) a simple parity bit may already allow detecting most bit errors. The number of parity check errors can be counted while reading from the buffer.

Methods and devices according to the disclosure may be based on the following findings: The parity check error counter may be reset for every data block which may be protected by its own CRC ("CRC block"), e.g. a HSUPA transport block or an LTE code or transport block. If any parity check error occurs inside a CRC block, it may be marked as erroneous and immediately reported back to the higher layers of the protocol stack. As soon as the higher layers are notified, they can start to prepare the re-transmission to the physical layer. Meanwhile the physical layer may continue preparing the uplink transmission, i.e. it may read the complete data block from memory and may compute a CRC. If any parity check error occurred in the current CRC block, the physical layer may invalidate the CRC, e.g. by scrambling it with a random bit sequence. With this mechanism, the CRC block can be identified as being erroneous on the receiving side. The physical layer may afterwards continue its uplink processing and may transmit the data block over the air. The receiving side (e.g. a base station) may demodulate and decode the data block and after the "provoked" CRC failure may initiate a normal re-transmission. A major advantage of most uplink re-transmission schemes (e.g. in HSUPA or LTE) is the synchronous HARQ scheme, i.e. an uplink re-transmission only happens at a pre-determined point in time. This can be exploited to further relax the timing constraint by pulling in the uplink processing as soon as a failure is detected.

The present disclosure also supports a computer program product including computer executable code or computer executable instructions that, when executed, causes at least one computer to execute the performing and computing steps described herein, in particular the methods 500 and 600 as described above with respect to FIGS. 5 and 6 and the techniques described above with respect to FIGS. 1 to 9. Such a computer program product may include a readable storage medium storing program code thereon for use by a computer. The program code may perform the method 500 as described above with respect to FIG. 5 or the method 600 as described above with respect to FIG. 6.

EXAMPLES

The following examples pertain to further embodiments. Example 1 is a method for protecting a data transport block against memory errors and transmission errors, the method comprising: attaching a first redundancy section to the data transport block for protecting the data transport block against memory errors and providing the data transport block in a memory buffer; attaching a second redundancy section to the data transport block read from the memory buffer for protecting the data transport block against transmission errors and providing the data transport block for transmission; and invalidating the second redundancy section if an evaluation of the first redundancy section of the data transport block read from the memory buffer indicates a memory error.

In Example 2, the subject matter of Example 1 can optionally include providing the first redundancy section based on a parity check of the data transport block.

In Example 3, the subject matter of any one of Examples 1-2 can optionally include that the first redundancy section comprises at least one parity bit indicating a parity of at least a part of the data transport block.

In Example 4, the subject matter of any one of Examples 1-3 can optionally include attaching a parity bit to the data transport block for each memory cell of the memory buffer in which the data transport block is provided.

In Example 5, the subject matter of any one of Examples 2 to 4 can optionally include that the evaluation of the first redundancy section comprises counting a number of parity check errors while reading the data transport block from the memory buffer.

In Example 6, the subject matter of any one of Examples 2 to 5 can optionally include invalidating the second redundancy section as soon as a first parity check error is detected.

In Example 7, the subject matter of any one of Examples 1 to 6 can optionally include transmitting the data transport block attached with the invalidated second redundancy section if a memory error is indicated.

In Example 8, the subject matter of any one of Examples 1 to 7 can optionally include providing the second redundancy section based on a cyclic redundancy check of the data transport block.

In Example 9, the subject matter of any one of Examples 1 to 8 can optionally include that invalidating the second redundancy section comprises reversing at least one bit of the second redundancy section or scrambling the second redundancy section with a scrambling sequence.

In Example 10, the subject matter of any one of Examples 1 to 9 can optionally include reporting an indicated memory error.

In Example 11, the subject matter of Example 10 can optionally include repairing the data transport block for which a memory error is reported; and providing the repaired data transport block for retransmission.

In Example 12, the subject matter of any one of Examples 1 to 11 can optionally include removing the first redundancy section from the data transport block when attaching the second redundancy section to the data transport block.

In Example 13, the subject matter of any one of Examples 1 to 12 can optionally include processing the data transport block and the attached second redundancy section for uplink transmission.

In Example 14, the subject matter of any one of Examples 1 to 13 can optionally include processing the data transport block and the attached second redundancy section according to a HARQ transmission scheme.

Example 15 is a device for protecting a data transport block against memory errors and transmission errors, the device comprising: a first protection circuit configured to attach a first redundancy section to the data transport block for protecting the data transport block against memory errors and configured to provide the data transport block in a memory buffer; a second protection circuit configured to attach a second redundancy section to the data transport block read from the memory buffer for protecting the data transport block against transmission errors and configured to provide the data transport block for transmission; and an invalidation circuit configured to invalidate the second redundancy section if an evaluation of the first redundancy section of the data transport block read from the memory buffer indicates a memory error.

In Example 16, the subject matter of Example 15 can optionally include a parity check circuit configured to check a parity of the data transport block, wherein the first protection circuit is configured to provide the first redundancy section based on the parity check of the data transport block.

In Example 17, the subject matter of any one of Examples 15 to 16 can optionally include a counter configured to count a number of parity check errors for the data transport block read from the memory buffer.

In Example 18, the subject matter of any one of Examples 15 to 17 can optionally include a cyclic redundancy check processing circuit configured to process a cyclic redundancy check of the data transport block, and that the second protection circuit is configured to provide the second redundancy section based on the cyclic redundancy check of the data transport block.

In Example 19, the subject matter of any one of Examples 15 to 18 can optionally include a bit reversing circuit configured to reverse at least one bit of the second redundancy section to invalidate the second redundancy section.

In Example 20, the subject matter of any one of Examples 15 to 18 can optionally include a scrambler configured to scramble the second redundancy section with a scrambling sequence to invalidate the second redundancy section.

In Example 21, the subject matter of any one of Examples 15 to 20 can optionally include a reporting circuit configured to report an indicated memory error.

In Example 22, the subject matter of Example 21 can optionally include a protocol processing circuit, configured to repair the data transport block for which a memory error is reported and to provide the repaired data transport block for retransmission.

Example 23 is an on-chip system for protecting a data transport block against memory errors and transmission errors, the on-chip system comprising: a first protection circuit configured to attach at least one parity bit to the data transport block for protecting the data transport block against memory errors, the at least one parity bit determined over at least apart of the data transport block and configured to provide the data transport block in a memory buffer; a second protection circuit configured to attach a cyclic redundancy checksum to the data transport block read from the memory buffer for protecting the data transport block against transmission errors and configured to provide the data transport block for transmission; and an invalidation circuit configured to invalidate the cyclic redundancy checksum if an evaluation of the at least one parity bit of the data transport block read from the memory buffer indicates a parity error.

In Example 24, the subject matter of Example 23 can optionally include a protocol processing circuit configured to repair the data transport block for which a parity error is indicated and to provide the repaired data transport block for retransmission.

Example 25 is a computer readable medium on which computer instructions are stored which when executed by a computer, cause the computer to perform the method of one of Examples 1 to 14.

Example 26 is a device for protecting a data transport block against memory errors and transmission errors, the device comprising: means for attaching a first redundancy section to the data transport block for protecting the data transport block against memory errors and means for providing the data transport block in a memory buffer; means for attaching a second redundancy section to the data transport block read from the memory buffer for protecting the data transport block against transmission errors and means for providing the data transport block for transmission; and means for invalidating the second redundancy section if an evaluation of the first redundancy section of the data transport block read from the memory buffer indicates a memory error.

In Example 27, the subject matter of Example 26 can optionally include means for providing the first redundancy section based on a parity check of the data transport block.

In Example 28, the subject matter of any one of Examples 26-27 can optionally include that the first redundancy section comprises at least one parity bit indicating a parity of at least a part of the data transport block.

In Example 29, the subject matter of any one of Examples 26-28 can optionally include means for attaching a parity bit to the data transport block for each memory cell of the memory buffer in which the data transport block is provided.

In Example 30, the subject matter of any one of Examples 27 to 29 can optionally include means for counting a number of parity check errors while reading the data transport block from the memory buffer.

In Example 31, the subject matter of any one of Examples 27 to 30 can optionally include means for invalidating the second redundancy section as soon as a first parity check error is detected.

In Example 32, the subject matter of any one of Examples 26 to 31 can optionally include means for transmitting the data transport block attached with the invalidated second redundancy section if a memory error is indicated.

In Example 33, the subject matter of any one of Examples 26 to 32 can optionally include means for providing the second redundancy section based on a cyclic redundancy check of the data transport block.

In Example 34, the subject matter of any one of Examples 26 to 33 can optionally include that the means for invalidating the second redundancy section comprises means for reversing at least one bit of the second redundancy section or means for scrambling the second redundancy section with a scrambling sequence.

In Example 35, the subject matter of any one of Examples 26 to 34 can optionally include means for reporting an indicated memory error.

In Example 36, the subject matter of Example 35 can optionally include means for repairing the data transport block for which a memory error is reported; and means for providing the repaired data transport block for retransmission.

In Example 37, the subject matter of any one of Examples 26 to 36 can optionally include means for removing the first redundancy section from the data transport block when attaching the second redundancy section to the data transport block.

In Example 38, the subject matter of any one of Examples 26 to 37 can optionally include means for processing the data transport block and the attached second redundancy section for uplink transmission.

In Example 39, the subject matter of any one of Examples 26 to 38 can optionally include means for processing the data transport block and the attached second redundancy section according to a HARQ transmission scheme.

Example 40 is a system for protecting a data transport block against memory errors and transmission errors, the device comprising: a first protection circuit configured to attach a first redundancy section to the data transport block for protecting the data transport block against memory errors and configured to provide the data transport block in a memory buffer; a second protection circuit configured to attach a second redundancy section to the data transport block read from the memory buffer for protecting the data transport block against transmission errors and configured to provide the data transport block for transmission; and an invalidation circuit configured to invalidate the second redundancy section if an evaluation of the first redundancy section of the data transport block read from the memory buffer indicates a memory error.

In Example 41, the subject matter of Example 40 can optionally include a parity check circuit configured to check a parity of the data transport block, wherein the first protection circuit is configured to provide the first redundancy section based on the parity check of the data transport block.

In Example 42, the subject matter of any one of Examples 40 to 41 can optionally include a counter configured to count a number of parity check errors for the data transport block read from the memory buffer.

In Example 43, the subject matter of any one of Examples 40 to 42 can optionally include a cyclic redundancy check processing circuit configured to process a cyclic redundancy check of the data transport block, and that the second protection circuit is configured to provide the second redundancy section based on the cyclic redundancy check of the data transport block.

In Example 44, the subject matter of any one of Examples 40 to 43 can optionally include a bit reversing circuit configured to reverse at least one bit of the second redundancy section to invalidate the second redundancy section.

In Example 45, the subject matter of any one of Examples 40 to 44 can optionally include a scrambler configured to scramble the second redundancy section with a scrambling sequence to invalidate the second redundancy section.

In Example 46, the subject matter of any one of Examples 40 to 45 can optionally include a reporting circuit configured to report an indicated memory error.

In Example 47, the subject matter of Example 46 can optionally include a protocol processing circuit, configured to repair the data transport block for which a memory error is reported and to provide the repaired data transport block for retransmission.

In Example 48, the subject matter of any one of Examples 40-47 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A method for protecting a data transport block against memory errors and transmission errors, the method comprising:
retrieving, by a first protection circuit, the data transport block;
attaching, by the first protection circuit, a first redundancy section to the data transport block for protecting the data transport block against memory errors and providing the data transport block in a memory buffer;
attaching, by a second protection circuit, a second redundancy section to the data transport block read from the memory buffer for protecting the data transport block against transmission errors and providing the data transport block for transmission, the first redundancy section being removed when the second redundancy section is attached to the data transport block;
invalidating, by an invalidation circuit comprising a bit reversing circuit or a scrambler, the second redundancy section if an evaluation of the first redundancy section of the data transport block read from the memory buffer indicates a memory error,
wherein the bit reversing circuit is configured to reverse at least one bit of the second redundancy section, and the scrambler is configured to scramble the second redundancy section with a scrambling sequence;
transmitting, by a protocol processing circuit, the data transport block including the invalidated second redundancy section;
repairing, by the protocol processing circuit, the data transport block based on a retransmission request that resulted from a detection of the invalidated second redundancy section by a receiver; and
retransmitting, by the protocol processing circuit, the repaired data transport block,
wherein the invalidated second redundancy section enables the retransmission request to be received from the receiver within a time constraint that enables a cumulative time period associated with repairing the data transport block and retransmitting the repaired data transport block to be less than a pre-determined data retransmission duration of time defined by a communications protocol.

2. The method of claim 1, further comprising:
providing the first redundancy section based on a parity check of the data transport block.

3. The method of claim 1,
wherein the first redundancy section comprises at least one parity bit indicating a parity of at least a part of the data transport block.

4. The method of claim 1, further comprising:
attaching a parity bit to the data transport block for each memory cell of the memory buffer in which the data transport block is provided.

5. The method of claim 2,
wherein the evaluation of the first redundancy section comprises counting a number of parity check errors while reading the data transport block from the memory buffer.

6. The method of claim 2, further comprising:
invalidating the second redundancy section as soon as a first parity check error is detected.

7. The method of claim 1, further comprising:
providing the second redundancy section based on a cyclic redundancy check of the data transport block.

8. The method of claim 1,
wherein the invalidating the second redundancy section comprises reversing the at least one bit of the second redundancy section or scrambling the second redundancy section with the scrambling sequence.

9. The method of claim 1, further comprising:
reporting an indicated memory error.

10. The method of claim 1, further comprising:
processing the data transport block and the attached second redundancy section prior to the transmission.

11. The method of claim 1, further comprising:
processing the data transport block and the attached second redundancy section according to a Hybrid Automatic Repeat Request (HARQ) transmission scheme.

12. A device for protecting a data transport block against memory errors and transmission errors, the device comprising:
a first protection circuit configured to attach a first redundancy section to the data transport block for protecting the data transport block against memory errors and configured to provide the data transport block in a first memory buffer;
a second protection circuit configured to remove the first redundancy section and attach a second redundancy section to the data transport block read from the first memory buffer for protecting the data transport block against transmission errors, and configured to provide the data transport block for transmission;
an invalidation circuit comprising a bit reversing circuit or a scrambler, and configured to invalidate the second redundancy section if an evaluation of the first redundancy section of the data transport block read from the memory buffer indicates a memory error,
wherein the bit reversing circuit is configured to reverse at least one bit of the second redundancy section, and the scrambler is configured to scramble the second redundancy section with a scrambling sequence; and
a protocol processing circuit configured to (i) transmit the data transport block including the invalidated second redundancy section, (ii) repair the data transport block based on a retransmission request that resulted from a detection of the invalidated second redundancy section by a receiver, and (iii) retransmit the repaired data transport block,
wherein the invalidated second redundancy section enables the retransmission request to be received from the receiver within a time constraint that enables a cumulative time period associated with repairing the data transport block and retransmitting the repaired data transport block to be less than a pre-determined data retransmission duration of time defined by a communications protocol.

13. The device of claim 12, further comprising:
a parity check circuit configured to check a parity of the data transport block, wherein the first protection circuit is configured to provide the first redundancy section based on the parity check of the data transport block.

14. The device of claim 12, further comprising:
a counter configured to count a number of parity check errors for the data transport block read from the memory buffer.

15. The device of claim 12, further comprising:
a cyclic redundancy check processing circuit configured to process a cyclic redundancy check of the data transport block,
wherein the second protection circuit is configured to provide the second redundancy section based on the cyclic redundancy check of the data transport block.

16. The device of claim 12, wherein the invalidation circuit comprises:
the bit reversing circuit configured to reverse the at least one bit of the second redundancy section to invalidate the second redundancy section.

17. The device of claim 12, wherein the invalidation circuit comprises:
the scrambler configured to scramble the second redundancy section with the scrambling sequence to invalidate the second redundancy section.

18. The device of claim 12, further comprising:
a reporting circuit configured to report an indicated memory error.

19. An on-chip system for protecting a data transport block against memory errors and transmission errors, the on-chip system comprising:
a first protection circuit configured to attach at least one parity bit to the data transport block for protecting the data transport block against memory errors, the at least one parity bit determined over at least a part of the data transport block and configured to provide the data transport block in a memory buffer;
a second protection circuit configured to remove the at least one parity bit and attach a cyclic redundancy checksum to the data transport block read from the first memory buffer for protecting the data transport block against transmission errors, and configured to provide the data transport block for transmission;
an invalidation circuit comprising a bit reversing circuit or a scrambler, and configured to invalidate the cyclic redundancy checksum if an evaluation of the at least one parity bit of the data transport block read from the first memory buffer indicates a parity error,
wherein the bit reversing circuit is configured to reverse at least one bit of a second redundancy section, and the scrambler is configured to scramble the second redundancy section with a scrambling sequence; and
a protocol processing circuit configured to (i) transmit the data transport block including the invalidated cyclic redundancy checksum, (ii) repair the data transport block based on a retransmission request that resulted from a detection of the invalidated second redundancy section by a receiver, and (iii) provide the repaired data transport block for retransmission,
wherein the invalidated cyclic redundancy checksum enables the retransmission request to be received from the receiver within a time constraint that enables a cumulative time period associated with repairing the data transport block and retransmitting the repaired data transport block to be less than a pre-determined data retransmission duration of time defined by a communications protocol.

20. A method for protecting a data transport block against memory errors and transmission errors, the method comprising:
retrieving, by a first protection circuit, the data transport block;
attaching, by the first protection circuit, a first redundancy section to the data transport block for protecting the data transport block against memory errors and providing the data transport block in a memory buffer;
attaching, by a second protection circuit, a second redundancy section to the data transport block read from the memory buffer for protecting the data transport block against transmission errors and providing the data transport block for transmission, the first redundancy section being removed when the second redundancy section is attached to the data transport block;
invalidating, by an invalidation circuit comprising a bit reversing circuit or a scrambler, the second redundancy section if an evaluation of the first redundancy section of the data transport block read from the memory buffer indicates a memory error,
wherein the bit reversing circuit is configured to reverse at least one bit of the second redundancy section, and the scrambler is configured to scramble the second redundancy section with a scrambling sequence;
transmitting, by a protocol processing circuit, the data transport block including the invalidated second redundancy section;
repairing, by the protocol processing circuit, the data transport block for which a memory error is reported in response to receiving a retransmission request that is sent by a receiver upon detection of the received invalidated second redundancy section by the receiver; and
retransmitting, by the protocol processing circuit, the repaired data transport block,
wherein the invalidated second redundancy section enables the retransmission request to be received from the receiver within a time constraint that enables a cumulative time period associated with repairing the data transport block and retransmitting the repaired data transport block to be less than a pre-determined data retransmission duration of time defined by a communications protocol.

* * * * *